US009864198B2

(12) United States Patent
Iwatsu

(10) Patent No.: US 9,864,198 B2
(45) Date of Patent: Jan. 9, 2018

(54) HEAD-MOUNTED DISPLAY

(71) Applicant: Sony Corporation, Tokyo (JP)

(72) Inventor: Takeshi Iwatsu, Kanagawa (JP)

(73) Assignee: Sony Corporation, Tokyo (JP)

(*) Notice: Subject to any disclaimer, the term of this patent is extended or adjusted under 35 U.S.C. 154(b) by 20 days.

(21) Appl. No.: 14/402,555

(22) PCT Filed: Dec. 5, 2013

(86) PCT No.: PCT/JP2013/007157
§ 371 (c)(1),
(2) Date: Nov. 20, 2014

(87) PCT Pub. No.: WO2014/128809
PCT Pub. Date: Aug. 28, 2014

(65) Prior Publication Data
US 2015/0138070 A1 May 21, 2015

(30) Foreign Application Priority Data
Feb. 22, 2013 (JP) ................. 2013-033075

(51) Int. Cl.
*G06F 3/01* (2006.01)
*G02B 27/01* (2006.01)
(Continued)

(52) U.S. Cl.
CPC ....... *G02B 27/0172* (2013.01); *G02B 27/017* (2013.01); *G06F 3/017* (2013.01);
(Continued)

(58) Field of Classification Search
CPC .............. G02B 27/0172; G02B 27/017; G02B 2027/0178; G02B 2027/0187;
(Continued)

(56) References Cited

U.S. PATENT DOCUMENTS

2010/0110368 A1* 5/2010 Chaum ................ G02B 27/017
351/158
2011/0242480 A1 10/2011 Reichow et al.
(Continued)

FOREIGN PATENT DOCUMENTS

JP 2001-272628 10/2001
JP 2012-148080 8/2012
(Continued)

OTHER PUBLICATIONS

International Search Report issued in connection with International Patent Application No. PCT/JP2013/007157, dated Mar. 18, 2014. (2 pages).

*Primary Examiner* — Christopher E Leiby
(74) *Attorney, Agent, or Firm* — K&L Gates LLP

(57) ABSTRACT

A head-mounted display includes a mounting unit, a display unit, a sensor unit, and a control unit. The mounting unit is configured to be mountable on a head of a user. The display unit is provided in the mounting unit and capable of providing the user with a field of view of a real space. The sensor unit is provided in a periphery of the display unit, includes a sensor that is capable of detecting a hand of the user that is brought close to or in contact with the sensor due to an action of the user, and performs output based on a detection result of the sensor. The control unit displays an image in the field of view and changes a display state of the image, based on a change in output of the sensor unit. With this configuration, the head-mounted display enables an intuitive operation to be performed using a natural action of the user.

25 Claims, 12 Drawing Sheets

(51) Int. Cl.
  *G06T 3/40* (2006.01)
  *G06T 11/00* (2006.01)
(52) U.S. Cl.
  CPC ............... *G02B 2027/0118* (2013.01); *G02B 2027/0123* (2013.01); *G02B 2027/0178* (2013.01); *G02B 2027/0187* (2013.01); *G06T 3/40* (2013.01); *G06T 11/001* (2013.01)
(58) Field of Classification Search
  CPC .... G02B 2027/0118; G02B 2027/0123; G06F 3/017; G06T 3/40; G06T 11/001
  See application file for complete search history.

(56) References Cited

U.S. PATENT DOCUMENTS

| | | |
|---|---|---|
| 2012/0056847 A1 | 3/2012 | Milford |
| 2012/0320100 A1 | 12/2012 | Machida et al. |
| 2014/0002442 A1* | 1/2014 | Lamb .................. G06F 3/1431 345/419 |
| 2014/0063055 A1* | 3/2014 | Osterhout ............... G06F 3/005 345/633 |

FOREIGN PATENT DOCUMENTS

| | | |
|---|---|---|
| JP | 2013-005201 | 1/2013 |
| WO | 2012/011893 | 1/2012 |

* cited by examiner

HEAD-MOUNTED DISPLAY

CROSS REFERENCES TO RELATED APPLICATIONS

The present application is a national stage of International Application No. PCT/JP2013/007157 filed on Dec. 5, 2013 and claims priority to Japanese Patent Application No. 2013-033075 filed on Feb. 22, 2013, the disclosure of which is incorporated herein by reference.

BACKGROUND

The present technology relates to a configuration that improves the operability of a head-mounted display.

In recent years, a head-mounted display that is capable of providing a user with image information without obstructing a field of view of the user in a real space has attracted attention. Patent Document 1 has disclosed a see-through-type head-mounted display. This head-mounted display is capable of displaying an image having a high contrast in the field of view of the user.

Patent Document 1: Japanese Patent Application Laid-open No. 2013-005201

SUMMARY

Problem to be Solved by the Invention

Currently, the head-mounted display is expected to be used for a variety of applications. Therefore, in order to enable the user to easily perform operations in various environments, it is desirable that the head-mounted display have good operability.

In view of the above-mentioned circumstances, it is an object of the present technology to improve the operability of a head-mounted display.

Means for Solving the Problem

In order to achieve the above-mentioned object, a head-mounted display according to an embodiment of the present technology includes a mounting unit, a display unit, a sensor unit, and a control unit.

The mounting unit is configured to be mountable on a head of a user.

The display unit is provided in the mounting unit and capable of providing the user with a field of view of a real space.

The sensor unit is provided in a periphery of the display unit, includes a sensor that is capable of detecting a hand of the user that is brought close to or in contact with the sensor due to an action of the user, and performs output based on a detection result of the sensor.

The control unit displays an image in the field of view and changes, based on a change in output of the sensor unit, a display state of the image.

With this configuration, the user can perform an operation for changing the display state of the image viewed by the user, using an action of the hand in the periphery of the display unit corresponding to the position of the eyes. That is, in this configuration, the user can operate the display state of the image near the eyes viewing the image, and hence an intuitive operation can be performed using a natural action of the user.

The control unit may emphasize the image based on the detection result of the sensor unit.

Specifically, the control unit may enlarge the image based on the detection result of the sensor unit.

Further, the control unit may increase a contrast of the image in the field of view based on the detection result of the sensor unit.

In addition, the control unit may increase the contrast of the image in the field of view by changing the color of the image.

With these configurations, the user is enabled to easily view the image in the case where it is difficult to view the image in some environments where the head-mounted display is used.

The control unit may be capable of displaying a plurality of images, to which priorities are added, in the field of view, and emphasize, based on the detection result of the sensor unit, the image having a high priority in comparison with the image having a low priority.

With these configurations, the user is enabled to easily view a more notable image.

The control unit may increase, based on the detection result of the sensor unit, an amount of information of an image displayed in the field of view.

Specifically, the control unit may reduce each image in size and increases an amount of information of an image displayed in the field of view.

With these configurations, the user can increase the amount of obtained information in the case where more information is necessary.

The display unit may include an optical filter having a variable visible light transmittance.

The control unit may lower, based on the detection result of the sensor unit, the visible light transmittance of the optical filter.

With this configuration, by limiting visible light other than a displayed image, the user is enabled to easily view the image.

The control unit may cause, based on the detection result of the sensor unit, the optical filter to cut off visible light.

With this configuration, only the image is displayed in the field of view, and hence the user can concentrate on only the image.

The sensor unit may include a plurality of sensors and perform output based on a detection state of the hand of the user in the plurality of sensors.

The control unit may change the display state of the image on a reference mode on which any of the plurality of sensors does not detect the hand of the user, based on a change in output of the sensor unit from the reference mode.

With this configuration, the sensor unit can perform a plurality of kinds of output depending on the above-mentioned detection state. Thus, in this configuration, the user can perform a variety of operations relating to the display state of the image.

The sensor unit may emphasize, on an emphasis mode on which the detection state is in a predetermined pattern, the image in comparison with the reference mode.

With this configuration, the user is enabled to easily view a more notable image.

The plurality of sensors may include a pair of sensors provided outside both eyes of the user who wears the mounting unit.

With this configuration, the sensor unit includes the sensors at two positions spaced away from each other, and hence erroneous operations of the user can be reduced.

The control unit may make a degree of emphasis of the image higher in a first state in which both of the pair of sensors do not detect the hand of the user, a second state in which either one of the pair of sensors detects the hand of the user, and a third state in which both of the pair of sensors detect the hand of the user, in the order of the first state, the second state, and the third state.

With this configuration, the image is emphasized by the user covering the eye with the hand and the image is further emphasized by the user covering the both eyes with the hand. That is, in this configuration, the user is enabled to easily view the image in a gradual manner by a natural action of the user covering the eye with the hand performed in the case where the user is dazzled by external light, for example.

The control unit may increase, on a specific mode on which the detection state is in a predetermined pattern, an amount of information of an image displayed in the field of view in comparison with the reference mode.

With this configuration, the user can increase the amount of obtained information in the case where more information is necessary.

The sensor may be configured as a toggle sensor.

The control unit may change the display state of the image when the toggle sensor detects the hand of the user.

With this configuration, by operating the toggle sensor, the user can change the display state of the image.

The control unit may change, when the toggle sensor detects the hand of the user, the display state among the reference mode, an emphasis mode on which the image is emphasized in comparison with the reference mode, and a specific mode on which an amount of information of an image displayed in the field of view is increased in comparison with the reference mode.

With this configuration, by operating the toggle sensor, the user can freely change the display state of the image among the three modes determined in advance.

The toggle sensor may be located at a position between both eyes of the user who wears the mounting unit.

With this configuration, the toggle sensor is in a bridge portion of general eyeglasses, and hence the user can operate the display state of the image by a natural action similar to an action performed in the case where the user corrects the tilt of the eyeglasses, for example.

Effect of the Invention

As described above, according to the present technology, it is possible to provide a head-mounted display that can be operated according to a more natural action performed by the user.

Additional features and advantages are described herein, and will be apparent from the following Detailed Description and the figures.

DETAILED DESCRIPTION

Hereinafter, embodiments according to the present technology will be described with reference to the drawings.

First Embodiment

[Configuration of Head-Mounted Display System]

Figure 1:
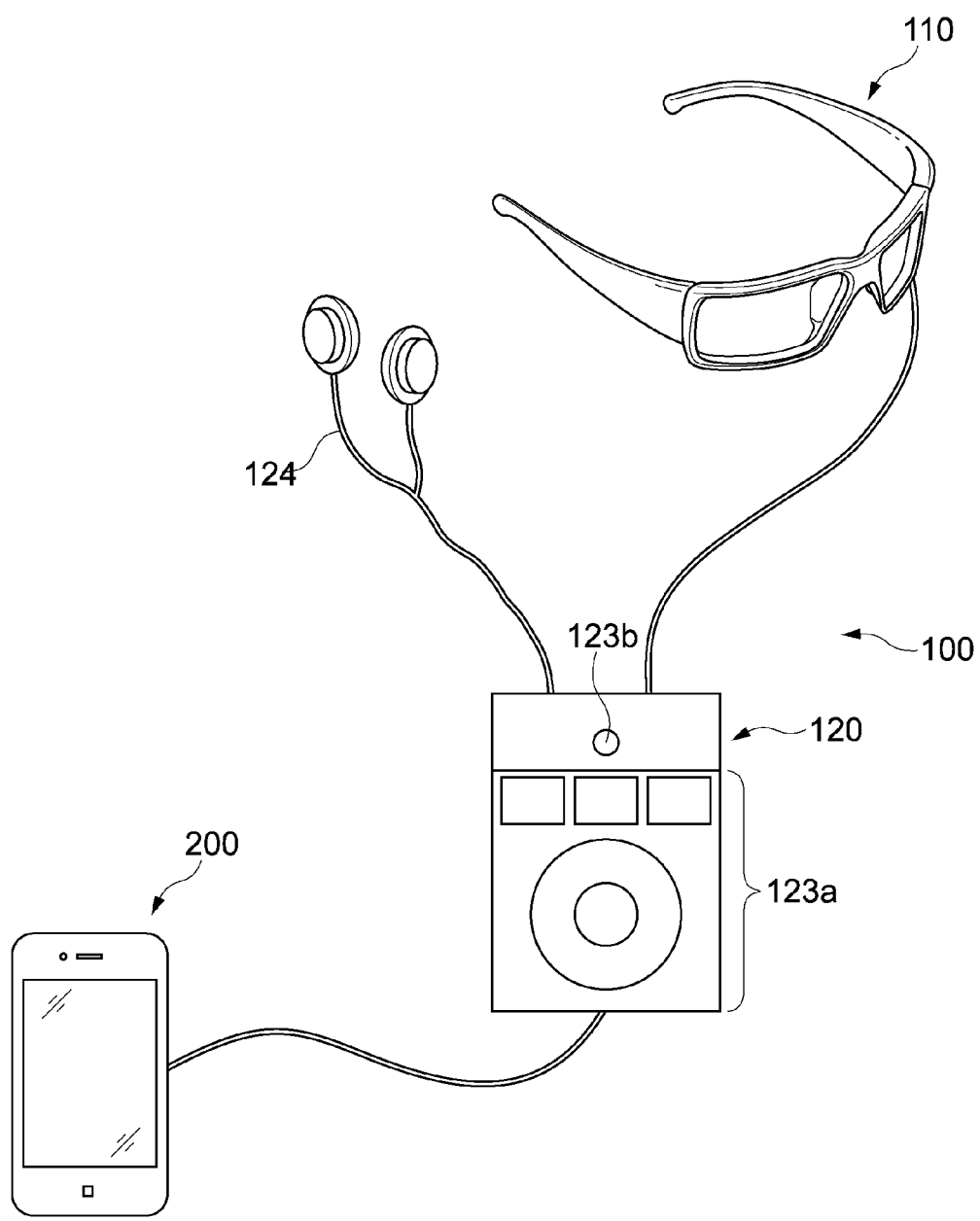
FIG. 1 A general view schematically showing a head-mounted display system according to a first embodiment of the present technology.
Figure 2:
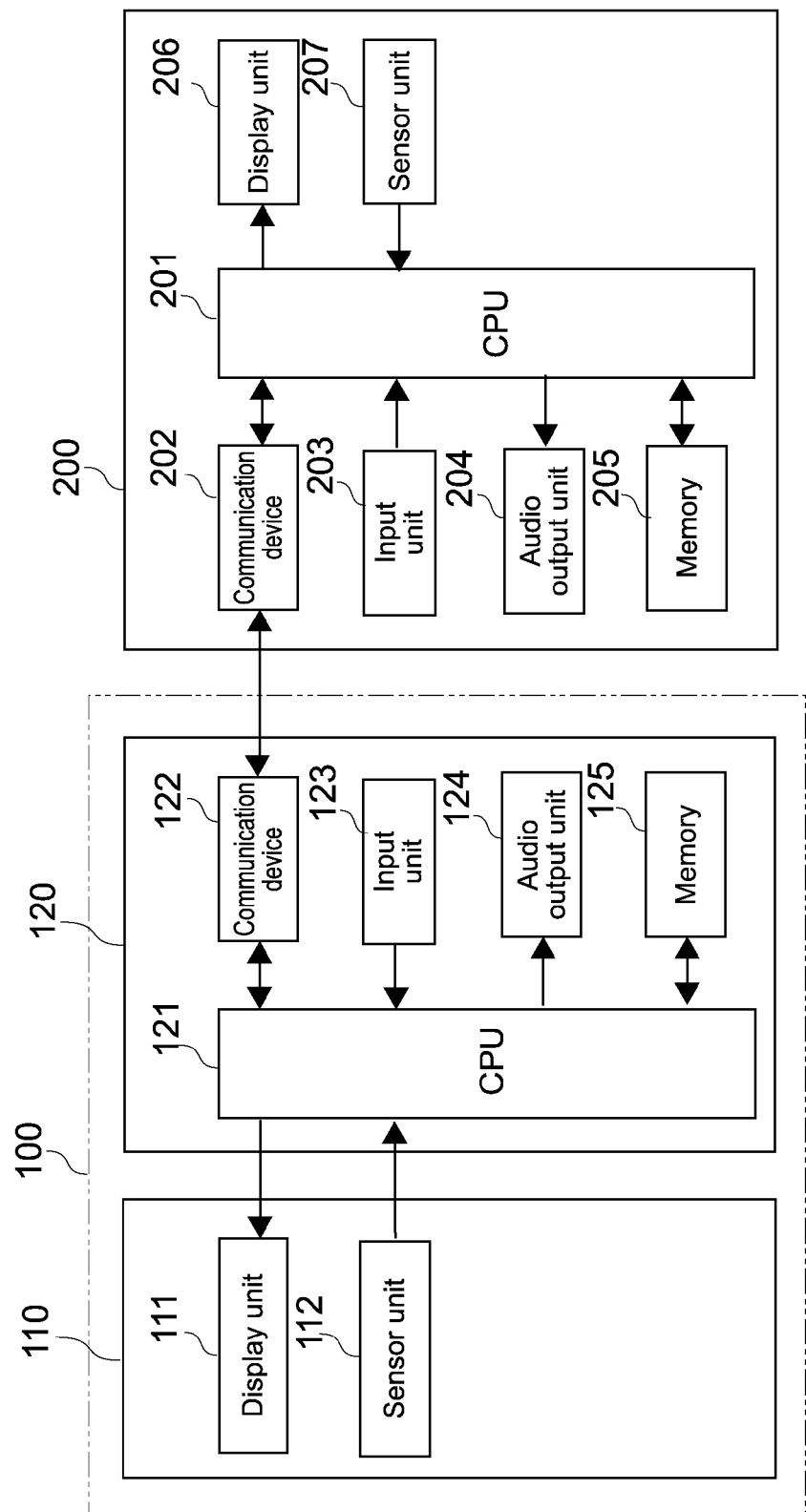
FIG. 2 A block diagram schematically showing the head-mounted display system shown in FIG. 1.

FIG. 1 is a schematic view showing an entire head-mounted display system according to a first embodiment of the present technology. FIG. 2 is a block diagram showing a schematic configuration of the head-mounted display system.

The head-mounted display system according to this embodiment is constituted of a head-mounted display (hereinafter, referred to as "HMD") 100 and an information processing apparatus 200. The HMD 100 is constituted of a mounting unit 110 and a control unit 120.

(HMD 100)

(1) Mounting Unit 110

Figure 3:
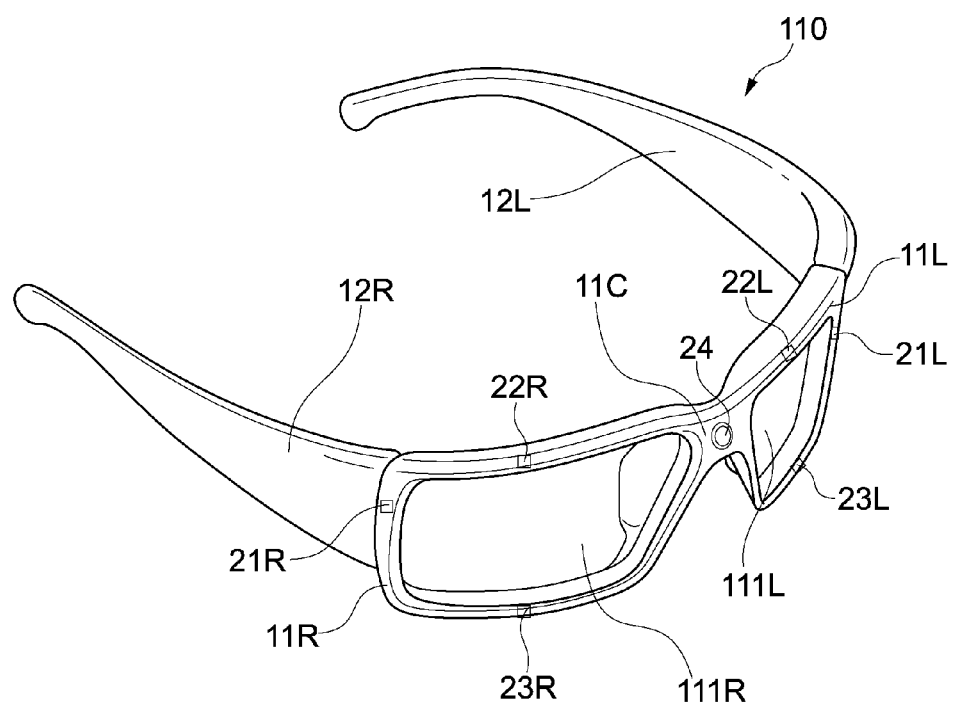
FIG. 3 A perspective view showing a mounting unit of the head-mounted display shown in FIG. 1 in an enlarged state.

FIG. 3 is a perspective view showing a mounting unit 110 in an enlarged state. The mounting unit 110 is configured to be detachable from a head of a user like general eyeglasses. Specifically, the mounting unit 110 includes temples 12R and 12L that are supported by the ears of the user and sandwich the temporal regions of the head from both sides and rim portions 11R, 11L, and 11C that are supported by the temples 12R and 12L and the nose of the user and opposed to the face of the user. The temples 12R and 12L and the rim portions 11R, 11L, and 11C constitute a frame portion of the mounting unit 110.

The rim portion is constituted of a right rim 11R corresponding to a position of the right eye of the user, a left rim 11L corresponding to a position of the left eye of the user, and a bridge 11C that links between the right rim 11R and the left rim 11L.

Further, as shown in FIG. 2, the mounting unit 110 includes a display unit 111 and a sensor unit 112. The display unit 111 is constituted of a right display unit 111R and a left display unit 111L shown in FIG. 3. The sensor unit 112 includes sensors 21R, 22R, 23R, 21L, 22L, 23L, and 24 that are capable of detecting a hand of the user. Further, in order to detect a motion or the like of the head of the user who wears the mounting unit 110, the sensor unit 112 may include a gyro sensor, a magnetic-field sensor, an angular velocity sensor, an acceleration sensor, and the like.

The right display unit 111R and the left display unit 111L of the display unit 111 are arranged in positions opposed to the right and left eyes of the user, respectively. The right display unit 111R and the left display unit 111L of the display unit 111 are supported by the right rim 11R and the left rim 11L around them.

The sensors 21R, 22R, and 23R of the sensor unit 112 are provided in the right rim 11R and the sensors 21L, 22L, and 23L are provided in the left rim 11L. The sensor 24 is provided in the bridge 11C. The sensor 21R and 21L constitute a pair of sensors and are arranged in sites near the temples 12R and 12L. The sensors 22R and 22L are arranged above the rims 11R and 11L, respectively. The sensors 23R and 23L are arranged below the rims 11R and 11L, respectively.

A proximity sensor or a touch sensor that detects a detection target that is brought close to or in contact with it is employed as each of the sensors 21R, 22R, 23R, 21L, 22L, 23L, and 24. Examples of the proximity sensor include an illuminance sensor and a capacitance sensor. Examples of the touch sensor include a resistive film sensor and a surface acoustic wave sensor. In addition, a push-button switch can also be employed. In this embodiment, the sensors 21R, 22R, 23R, 21L, 22L, and 23L are configured as illuminance sensors and each output, for example, a decrease in illuminance due to proximity of the hand of the user to the control unit 120. Further, the sensor 24 is configured as a resistive film sensor and, for example, outputs a change in voltage due to contact of the hand of the user to the control unit 120.

Figure 4:
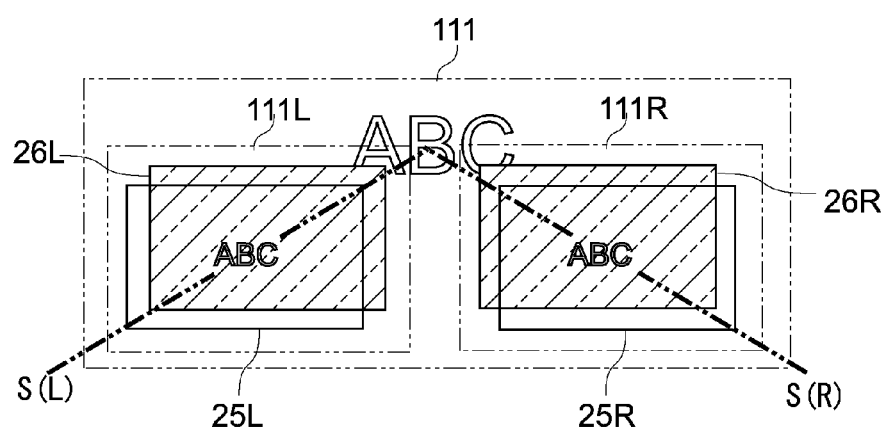
FIG. 4 A view showing a schematic configuration of a display unit shown in FIG. 3.

FIG. 4 is a schematic diagram showing a configuration of the display unit 111 of the mounting unit 110. The display unit 111 permits visible light to pass therethrough in the thickness direction thereof and has a so-called see-through-type configuration. The display units 111R and 111L are constituted of display panels 25R and 25L and optical filters 26R and 26L, respectively.

The display panel 25R and the display panel 25L can be each constituted of a display element that forms image light according to an input signal from a CPU 121 and a light guide member that guides image light formed by the display element to the right eye and the left eye of the user. With this, the display panels 25R and 25L can present an image to the user.

In this embodiment, the display element of each of the display panels 25R and 25L is constituted of a liquid crystal display (LCD) element. Each display element is constituted of a plurality of pixels arranged in a matrix form and a light source formed of a light emitting diode (LED) or the like. The display element converts light generated by the light source into image light by modifying the pixels according to an input signal from the CPU 121. For the display element, for example, a three-plate method of emitting image light beams corresponding to the colors of R (red), G (green), and B (blue) can be used or a single-plate method of emitting image light beams corresponding to the colors at the same time can also be used.

The light guide member of each of the display panels 25R and 25L is configured to cause the image light formed by the display element to propagate therethrough and be emitted to the eyes of the user. Specifically, the light guide member is constituted of a transparent member in which light can be totally reflected, hologram diffraction grating capable of efficiently refracting light of a particular wavelength band, or the like.

FIG. 4 schematically shows an example in which the display panel 25R and the display panel 25L emit image light to the right eye and the left eye of the user, respectively, to thereby present a character image "ABC" to the user. Further, in FIG. 4, visual lines S(R) and S(L) of the both eyes of the user are indicated by two-dot chain lines.

In the example shown in FIG. 4, the user recognizes, due to binocular parallax, image light beams incident upon the right eye and the left eye as if the single character image "ABC" is displayed in a position in which the visual lines S(R) and S(L) intersect with each other. That is, the user recognizes them as if the character image "ABC" is displayed in a position spaced by a predetermined distance from the user in the real space. Due to the display panels 25R and 25L, the HMD 100 is capable of displaying an image having an arbitrary size at an arbitrary position in a three-dimensional space of the field of view of the user.

The optical filters 26R and 26L are configured as variable filters each having a variable visible light transmittance. For the optical filters 26R and 26L, a configuration in which the visible light transmittance can be consecutively changed from 0% to 100% can be used. A configuration in which the visible light transmittance can be changed among predetermined values, for example, 0%, 50%, and 100% can also be used.

In addition, liquid crystal shutters can also be used as the optical filters 26R and 26L. In this case, the optical filters 26R and 26L are configured to be switchable between a transmissive state in which the visible light transmittance is 100% and a cut-off state in which the visible light transmittance is 0%. When the visible light transmittance of the optical filters 26R and 26L is 0%, only images displayed by the display panels 25R and 25L are in the field of view of the user.

(2) Control Unit 120

As shown in FIG. 1, the control unit 120 is connected to the mounting unit 110 and capable of communicating with the mounting unit 110. The control unit 120 and the mounting unit 110 may be connected to each other with a wire or may be wirelessly connected to each other. Specifically, the control unit 120 and the mounting unit 110 are communicably connected to each other based on various communication standards such as a universal serial bus (USB), Bluetooth (registered trademark), and Wi-Fi (registered trademark).

As shown in FIG. 2, the control unit 120 can be constituted of a central processing unit (CPU) 121, a communication device 122, an input unit 123, an audio output unit 124, and a memory 125.

The CPU 121 performs various types of arithmetic processing relating to the HMD 100 and takes charge of operating the HMD 100. Therefore, the CPU 121 transmits and receives signals to/from the components within the control unit 120 and also transmits and receives signals to/from the mounting unit 110. For example, the CPU 121 is capable of determining, based on an output of the sensor unit 112, when a decrease in illuminance of the illuminance sensors 21R to 23L is above a predetermined threshold value, that the sensors detect the hand of the user, and correspondingly controlling the display unit 111.

The communication device 122 is provided for performing a communication between the HMD 100 and the information processing apparatus 200. The HMD 100 and the information processing apparatus 200 may be connected with a wire or may be wirelessly connected to each other. Specifically, the communication device 122 is connected such that the HMD 100 and the information processing apparatus 200 are communicable based on various types of communication standards such as USB, Bluetooth (registered trademark), and Wi-Fi (registered trademark).

The input unit 123 is, as shown in FIG. 1, constituted of an operation portion 123a provided with various buttons that receive input operations performed by the user's finger, an audio input portion (microphone) 123b into which audio information on voice of the user and the like are input, and the like. The input unit 123 outputs signals based on the input information to the CPU 121.

The audio output unit 124 is configured as earphones, a headphone, a speaker, or the like. The audio output unit outputs a signal input from the CPU 121 as audio.

The memory 125 is configured as a storage unit that stores an arithmetic processing result of the CPU 121 and information acquired from the information processing apparatus 200 and appropriately outputs the contents to the CPU.

(Information Processing Apparatus 200)

As shown in FIG. 2, the information processing apparatus 200 can be constituted of a CPU 201, a communication device 202, an input unit 203, an audio output unit 204, a memory 205, a display unit 206, and a sensor unit 207. The information processing apparatus 300 is configured as a portable information terminal such as a smart phone and a cellular phone. Further, the information processing apparatus 200 can also be configured as various information processing apparatuses such as a tablet computer and a laptop computer.

The CPU 201 performs various types of arithmetic processing relating to the information processing apparatus 200 and takes charge of operating the information processing apparatus 200. The communication device 202 corresponds to the communication device 122 in the control unit 120 of the HMD 100 and is configured to perform a communication between the HMD 100 and the information processing apparatus 200. The input unit 203 is configured as, for example, a touch panel display or a microphone and the audio output unit 204 is configured as, for example, a speaker. The memory 205 is configured as a storage unit that stores an arithmetic processing result or the like of the CPU 201. The display unit 206 is configured as, for example, a touch panel display.

The sensor unit 207 includes a global positioning system (GPS). Further, the sensor unit 207 may include a gyro sensor, a magnetic-field sensor, an angular velocity sensor, an acceleration sensor, and the like. In addition, the sensor unit 207 may include a temperature sensor, a humidity sensor, and the like.

The sensor unit 207 outputs a signal based on a detection result of each sensor to the CPU 201. The CPU 201 outputs information corresponding to the output of the sensor unit 207 to the display unit 206 or the HMD 100. With this, the information processing apparatus 200 is capable of acquiring various types of information on a position, an azimuth, weather, and the like.

Further, the information processing apparatus 200 is also capable of acquiring information required by the user through a communication means such as the Internet. In addition, the information processing apparatus 200 is also capable of acquiring information in response to a request of the HMD 100. Thus, the HMD 100 is also capable of acquiring information corresponding to a motion of the head of the user that is detected by the gyro sensor, the magnetic-field sensor, the angular velocity sensor, the acceleration sensor, or the like of the above-mentioned sensor unit 112, from the information processing apparatus 200.

[Functions of Head-Mounted Display System]

(Outline of Functions)

With the HMD 100, the user who wears the mounting unit 110 can view a landscape in front of the eyes via the display unit 111 and an image formed by the display panels 25R and 25L of the display unit 111 at the same time.

The display panels 25R and 25L are formed based on, for example, information acquired by the information processing apparatus 200. Thus, the HMD 100 is capable of providing the user with an image based on information on a position, an azimuth, weather, a RDF site summary (RSS), or the like. Further, the display panels 25R and 25L are also capable of providing the user with a screen of an application stored in the information processing apparatus 200.

In addition, the HMD 100 is also capable of acquiring information corresponding to the position of the user or the azimuth to which the user is directed via the information processing apparatus 200 and providing an image based on the information to the user. This enables the HMD 100 to provide the user with a landscape in front of the eyes via the display unit 111 and related information.

For example, in the case where the user walks in a shopping center, the HMD 100 is capable of providing the user with information on shops in the shopping center and the like. Further, if the user gets lost, the HMD 100 is also capable of guiding the user by the use of an image of an arrow or the like. In addition, in the case where the user walks on a golf course, the user can be provided with information on a hole number, a reference shot number (par) of the hole, a distance to a green, and the like.

(Image Display Mode)

The HMD 100 according to this embodiment can be configured to have a plurality of image display modes on which the display state of the image in the field of view of the user is different. Specifically, the HMD 100 can be configured to have the following image display mode, for example.

(1) Reference Mode

Figure 5A:
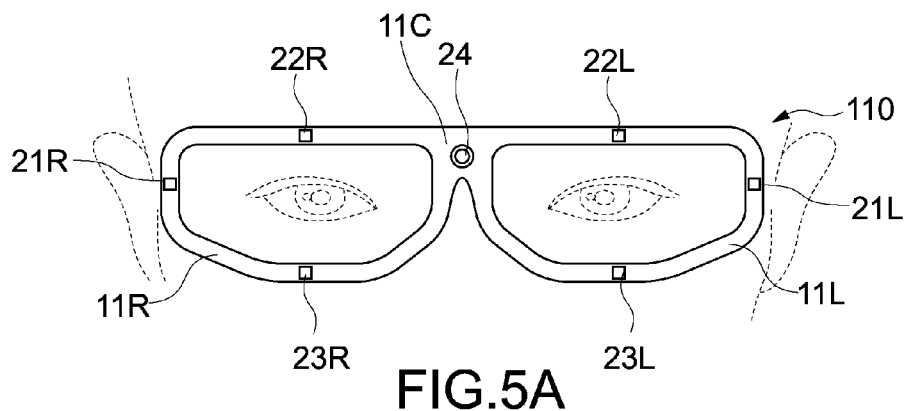
FIG. 5A A front view showing a state in which the mounting unit shown in FIG. 3 is worn by the user.

FIG. 5A is a front view showing a state in which the user wears the mounting unit 110 of the HMD 100. In the state shown in FIG. 5A, the hand of the user to be a detection target is not close to the sensors 21R, 22R, 23R, 21L, 22L, 23L, and 24. At this time, a reduction of an illuminance in the sensors 21R, 22R, 23R, 21L, 22L, 23L, and 24 is equal to or smaller than a predetermined threshold value. Thus, any of the sensors do not detect the hand of the user. In this case, the image display mode in the HMD 100 takes the reference mode.

Figure 5B:
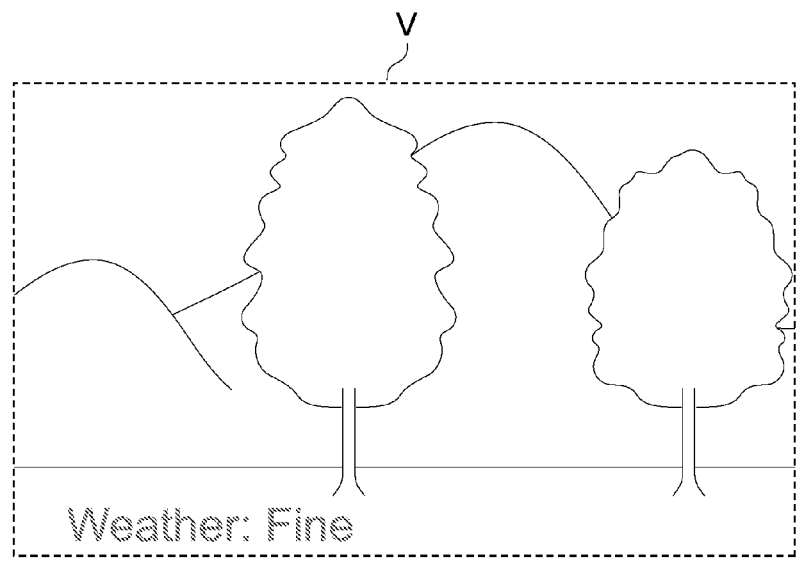
FIG. 5B A view illustrating a field of view of the user in the state shown in FIG. 5A.

FIG. 5B is a view illustrating a field of view V of the user on the reference mode. For the sake of description, FIG. 5B shows only a portion surrounded by a broken line as the field of view V of the user. The user can recognize, in the field of view V, a landscape viewed through the display unit 111 and a character image formed by the display panels 25R and 25L. In this example, the HMD 100 provides the user with the character image based on weather information.

(2) Emphasis Mode

Figure 6A:
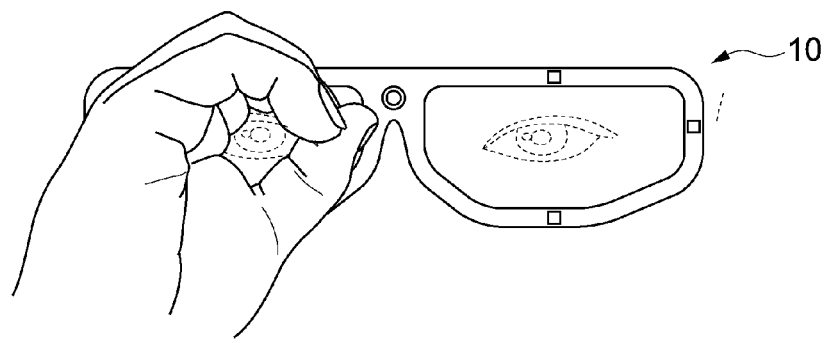
FIG. 6A A front view showing an example of an operation of the user in the first embodiment.
Figure 6B:
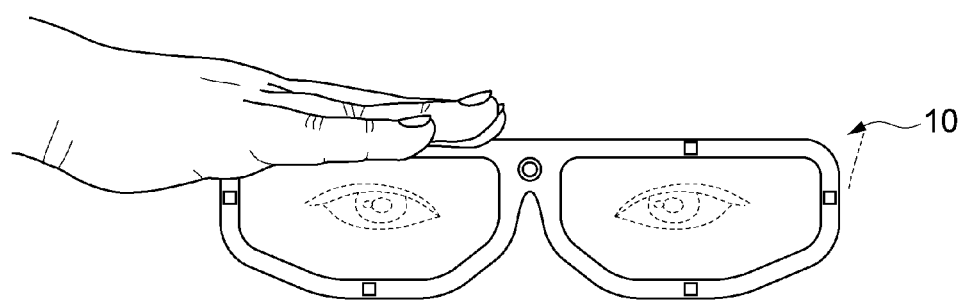
FIG. 6B A front view showing an example of the operation of the user in the first embodiment.

FIGS. 6A and 6B are views illustrating operations of the hand of the user in the HMD 100. FIG. 6A shows a state in which the user performs an action of looking in the hand imitating a telescope. FIG. 6B shows a state in which the user performs an action of putting the palm to the forehead for looking into the distance. The actions of the user in FIGS. 6A and 6B are both natural actions intuitively performed by the user when wishing to carefully view an object difficult to see.

In the state shown in FIG. 6A, the hand of the user is close to the sensors 21R, 22R, and 23R. Thus, the sensors 21R, 22R, and 23R detect the hand of the user. On the other hand, the hand of the user is not close to the sensors 21L, 22L, and 23L. Thus, the sensors 21L, 22L, and 23L do not detect the hand of the user. Further, in the state shown in FIG. 6B, the sensor 22R detects the hand of the user and the sensors 21R, 23R, 21L, 22L, and 23L do not detect the hand of the user. In these cases, the image display mode in the HMD 100 is transitioned to the emphasis mode.

FIGS. 7A to 7D are views illustrating the field of view V of the user on the emphasis mode. On the emphasis mode, an image is emphasized in the field of view V of the user in comparison with the reference mode shown in FIG. 5B. For example, the image is emphasized as shown in FIGS. 7A to 7D.

Figure 7A:
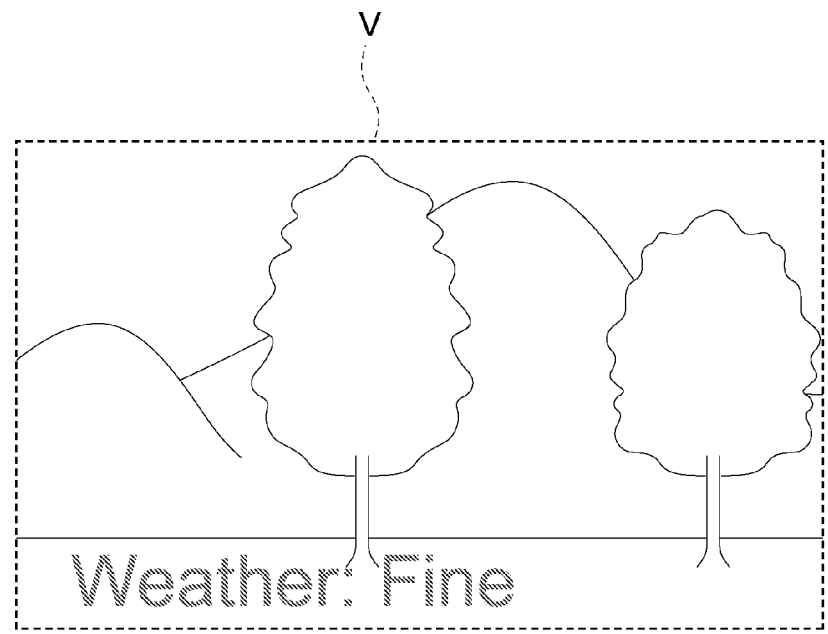
FIG. 7A A view illustrating the field of view of the user on an emphasis mode.

On the emphasis mode shown in FIG. 7A, the image is enlarged in comparison with the reference mode shown in FIG. 5B. In this case, the percentage of the area of the image occupying the field of view V of the user is increased, and hence the image is emphasized. The size of the image is not limited. If the character image as shown in FIG. 7A is larger than the width of the field of view V, the user can recognize all information of the character image by displaying the character image such that it is repeatedly scrolled from the right to the left.

Figure 7B:
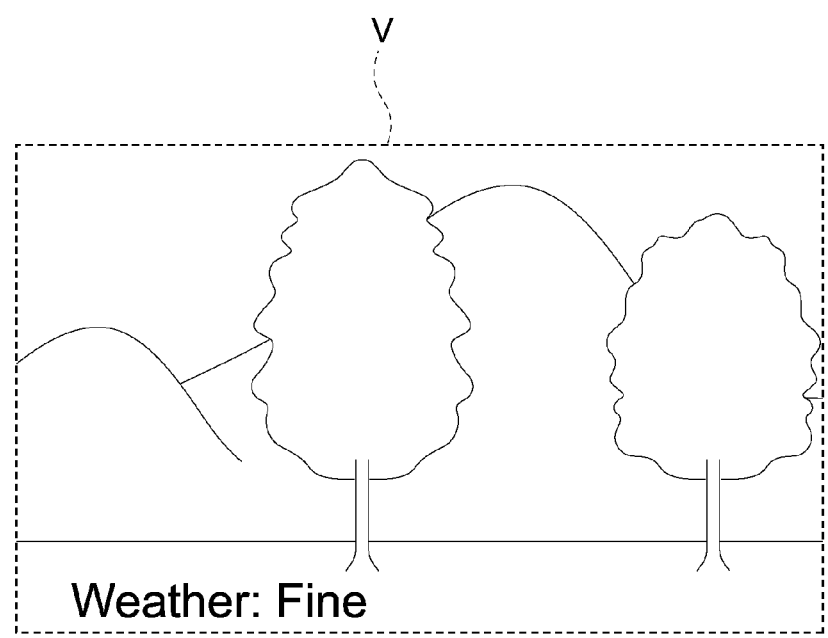
FIG. 7B A view illustrating the field of view of the user on an emphasis mode.

On the emphasis mode shown in FIG. 7B, the image is changed to have a higher contrast against the background in comparison with the reference mode shown in FIG. 5B. Specifically, the image is changed in luminance and color. The color of the image does not need to be a single color. The image can be in color having a high contrast against the background color for each portion of the image. In addition, the image may be moved to a position of the background color, in which the color contrast of the image is higher.

Figure 7C:
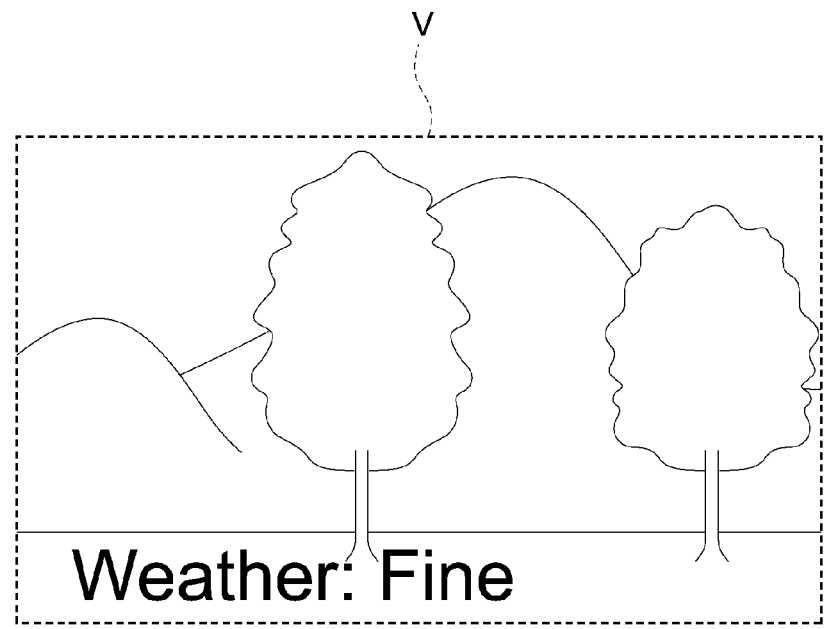
FIG. 7C A view illustrating the field of view of the user on an emphasis mode.

On the emphasis mode shown in FIG. 7C, in comparison with the reference mode shown in FIG. 5B, the image is enlarged and the color of the image is changed such that the contrast is increased against the background color. That is, the image in FIG. 7C is displayed combining the above-mentioned emphasis methods of the image in FIGS. 7A and 7B. Thus, using the method in FIG. 7C, it is possible to more clearly emphasize the image.

Figure 7D:
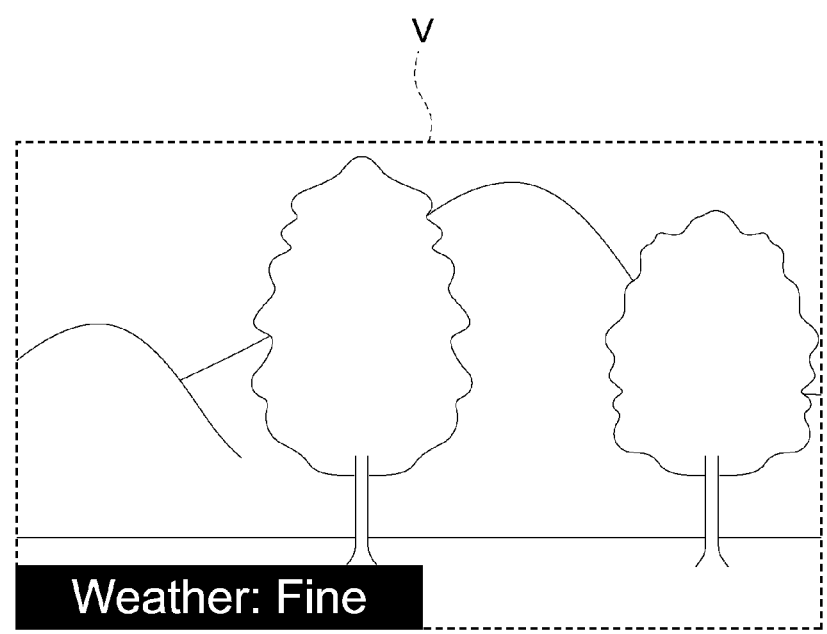
FIG. 7D A view illustrating the field of view of the user on an emphasis mode.

On the emphasis mode shown in FIG. 7D, the background color is changed such that the contrast of the color of the image is higher in comparison with the reference mode shown in FIG. 5B. It is not essential to change the background color of the image in the entire image. Only the background color of a part of the image may be changed.

Alternatively, the image may be framed by a color having a high contrast with respect to the color of the image, conforming the shape of the image.

As described above, the HMD 100 is transitioned to the emphasis mode by the natural action intuitively performed when the user wishes to carefully view the image. The image is emphasized, and hence it is easier for the user to view the image. Thus, with the HMD 100, the user is enabled to easily view the image by an intuitive action.

Note that, although the case where the user performs an action with the right hand has been described above, in the HMD 100, a case where the user performs an action with the left hand is the same as the case of performing an action with the right hand. That is, when the sensors 21L, 22L, and 23L detect the hand of the user and the sensors 21R, 22R, and 23R do not detect the hand of the user and when the sensor 22L detects the hand of the user and the sensors 21R, 22R, 23R, 21L, and 23L do not detect the hand of the user, the image display mode in the HMD 100 is transitioned to the emphasis mode.

Further, although the action of the user for changing the image display mode to the emphasis mode is not limited to the actions shown in FIGS. 6A and 6B, it is desirable to employ an action intuitively performed when the user wishes to carefully view the image. Further, the display state of the image on the emphasis mode is not limited to the examples shown in FIGS. 7A to 7D. For example, the HMD 100 may be configured to enable the user to recognize as if the image is closer to him or her by using the above-mentioned binocular parallax on the emphasis mode.

(3) Specific Mode

Figure 8A:
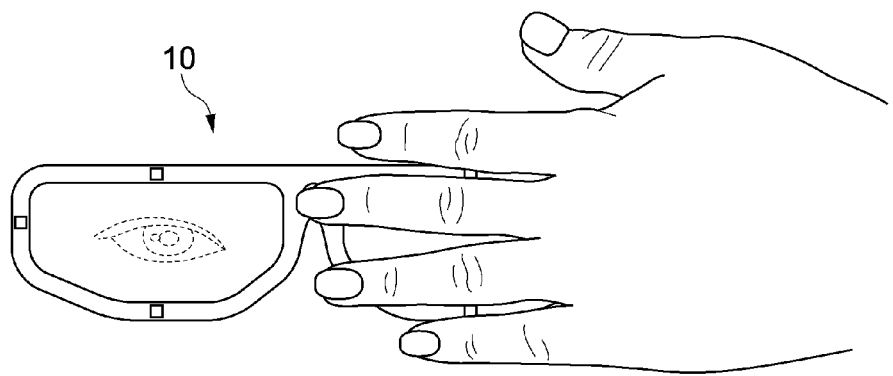
FIG. 8A A front view showing an example of the operation of the user in the first embodiment.
Figure 8B:
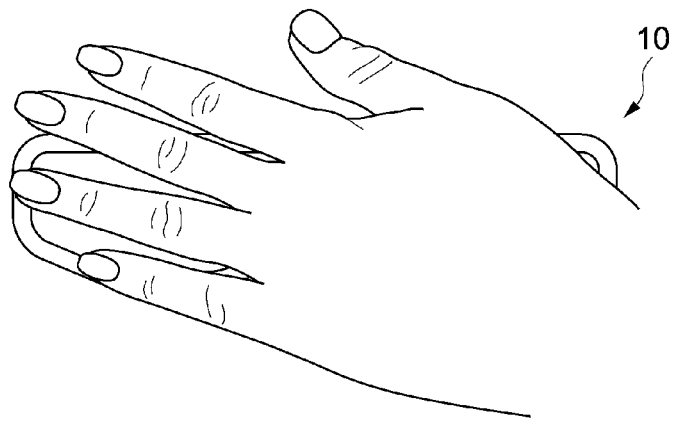
FIG. 8B A front view showing an example of the operation of the user in the first embodiment.

FIGS. 8A and 8B are views illustrating operations of the HMD 100, which are performed by the user's hand. FIG. 8A shows a state in which the user performs an action of covering the eye. FIG. 8B shows a state in which the user performs an action of covering the both eyes. The actions of the user in FIGS. 8A and 8B are both natural actions intuitively performed by the user when the user wishes to concentrate on the image and obtain much information. More specifically, the action shown in FIG. 8B is an action performed by the user when the user wishes to obtain more information in comparison with the action shown in FIG. 8A.

In the shown in FIG. 8A, the sensors 21L and 22L detect the hand of the user and the sensors 21R, 22R, 23R, and 23L do not detect the hand of the user. Further, in the state shown in FIG. 6B, any of the sensors 22R, 21R, 23R, 21L, 22L, and 23L does not detect the hand of the user. In these cases, the image display mode in the HMD 100 is transitioned to the specific mode.

Figure 9A:
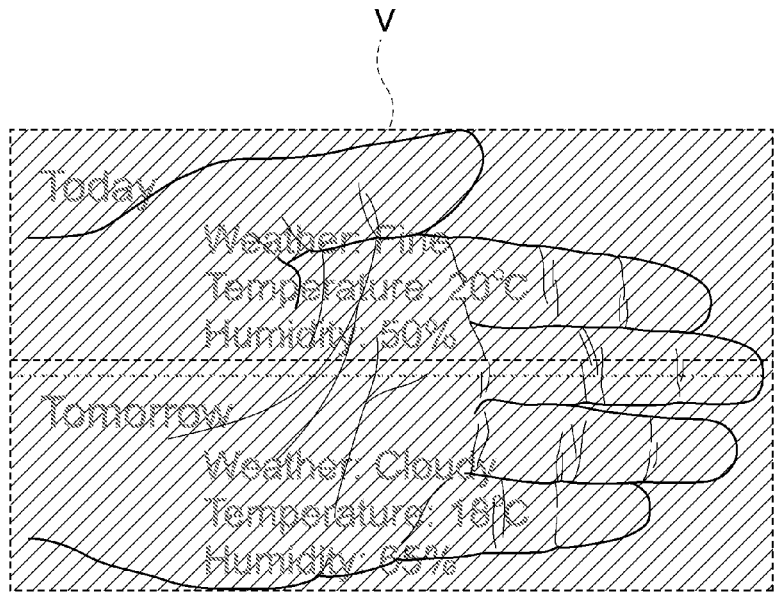
FIG. 9A A view illustrating the field of view of the user on a specific mode.
Figure 9B:
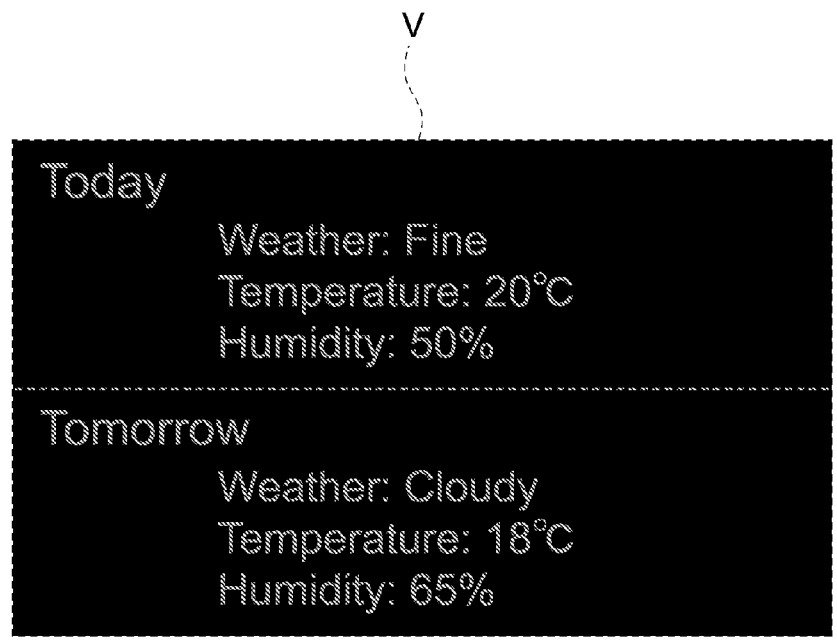
FIG. 9B A view illustrating the field of view of the user on the specific mode.
Figure 9C:
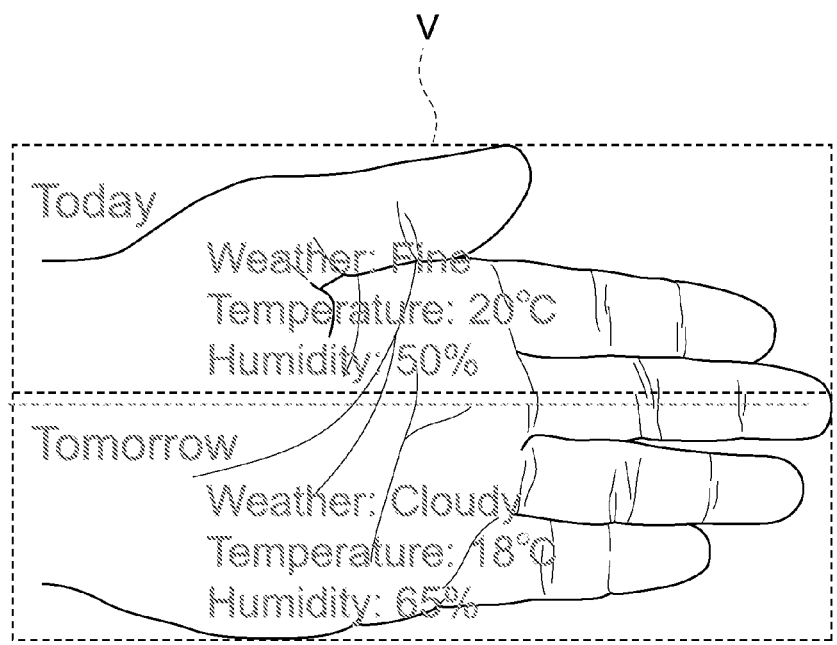
FIG. 9C A view illustrating the field of view of the user on the specific mode.

FIGS. 9A to 9C are views illustrating the field of view V of the user on the specific mode. On the specific mode, the amount of information of the image in the field of view V of the user (the amount of information presented by the image to the user) is increased in comparison with the reference mode. For example, as shown in FIGS. 9A to 9C, the amount of information of the image is increased.

FIG. 9A shows the field of view V of the user on the specific mode corresponding to the action shown in FIG. 8A. On the specific mode shown in FIG. 9A, the amount of information of the image displayed in the field of view V of the user is increased in comparison with the reference mode shown in FIG. 5B. Specifically, more weather information is provided in the field of view V of the user shown in FIG. 9A in comparison with the field of view V of the user shown in FIG. 5B. In the state shown in FIG. 9A, the display unit 111 widens the area in which the image is displayed and increases the amount of character image displayed, to thereby increase the amount of information of the image. In addition, the display unit 111 may also reduce each image (each character) in size, to thereby increase the amount of character image displayed.

As described above, the HMD 100 is transitioned to the specific mode by the natural action intuitively performed when the user wishes to obtain more information. The amount of information of the image is increased, and hence the user can obtain more information. In this manner, with the HMD 100, the user can obtain more information by an intuitive action. Note that, although the weather information is provided in the field of view V of the user in FIG. 9A, the field of view V of the user may be provided with specific information of the main body of the RSS on the specific mode in the case where the RSS is displayed on the reference mode shown in FIG. 5A.

Further, on the specific mode shown in FIG. 9A, the visible light transmittance in the optical filters 26R and 26L shown in FIG. 4 is set to 50%. Thus, on the specific mode shown in FIG. 9A, the landscape in the field of view V of the user, which is seen through the display unit 111, becomes dark. With this, the amount of information other than the image in the field of view V of the user is reduced, and hence the user can view the image in a more concentrated manner.

FIG. 9B shows the field of view V of the user on the specific mode corresponding to the action shown in FIG. 8B. On the specific mode shown in FIG. 9B, as on the specific mode shown in FIG. 9A, the amount of information of the image displayed in the field of view V of the user is increased. In addition, on the specific mode shown in FIG. 9B, the visible light transmittance in the optical filters 26R and 26L shown in FIG. 4 is set to 0%. That is, on the specific mode shown in FIG. 9B, only the image is provided in the field of view of the user. With this, the user can view the image in a much more concentrated manner than on the specific mode shown in FIG. 9A.

Between the specific mode shown in FIG. 9A and the specific mode shown in FIG. 9B, the visible light transmittance in the optical filters 26R and 26L is different. The user can use them as different image display modes. In the HMD 100, in order to achieve the specific mode shown in FIG. 9B, the user needs to cover all of the sensors including the sensor 21R and 21L located outside the both eyes with the hand. That is, unless the user covers the sensor 21R and the sensor 21L located at a furthest position from this sensor 21R at the same time, the specific mode shown in FIG. 9B is not achieved. Thus, an erroneous operation is prevented in the HMD 100.

FIG. 9C shows a modified example of FIG. 9B. On the specific mode shown in FIG. 9C, the visible light transmittance in the optical filters 26R and 26L is 100%. For example, in the case where the HMD 100 is used in an environment in which the landscape seen through the display unit 111 does not obstruct the display of the image, it is unnecessary to limit the visible light transmittance using the optical filters 26R and 26L. In such a case, a configuration without the optical filters 26R and 26L can be employed for the HMD 100.

Note that, although the case where the user performs an operation with the left hand has been described above, in the HMD 100, a case where the user performs an operation with the right hand is the same as the case of performing an operation with the left hand. That is, also when the sensors 21R and 22R detect the hand of the user and the sensors 23R, 21L, 22L, and 23L do not detect the hand of the user, the image display mode in the HMD 100 is transitioned to the emphasis mode shown in FIG. 9A.

(4) Other Image Display Modes

Other than the above-mentioned reference mode, emphasis mode, and specific mode, the HMD 100 can be configured to have an arbitrary image display mode that specifies the display state of the image in the field of view V of the user. Examples of the other image display modes include a mode on which the luminance of the image is reduced for reducing eye fatigue in contrast to the emphasis mode and a mode on which the amount of information of the image is reduced for making it easier to view the landscape in contrast to the specific mode.

Figure 10:
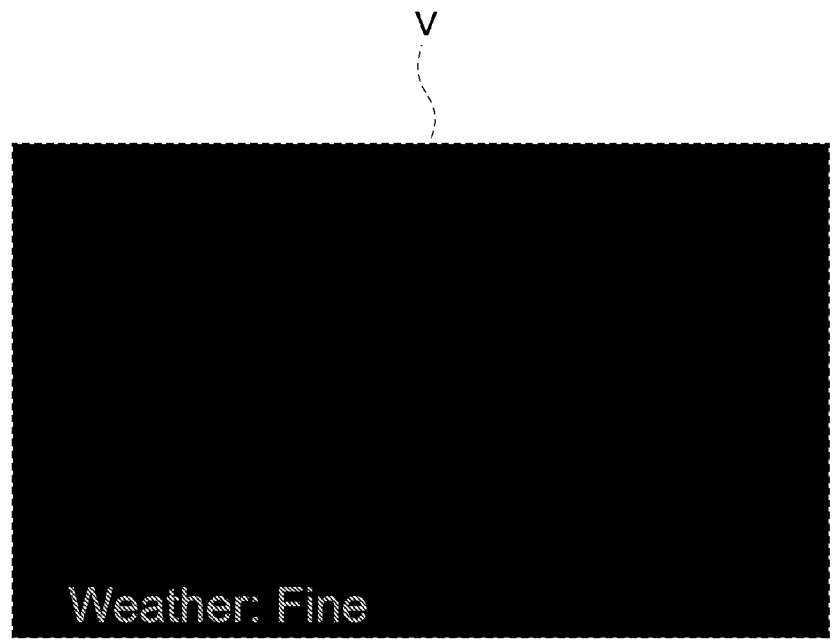
FIG. 10 A view illustrating the field of view of the user on another image display mode.

FIG. 10 shows an example of the other image display modes. On the image display mode shown in FIG. 10, although the display of the image is the same as on the reference mode, the visible light transmittance in the optical filters 26R and 26L is 0%. That is, on the image display mode shown in FIG. 10, only the image is provided in the field of view of the user. This image display mode is effective, for example, when the field of view V of the user is so bright that it is difficult to view the image.

(Change of Image Display Mode)

In the HMD 100, each image display mode is associated with a pattern of the detection state of the sensor unit 112 (hereinafter, simply referred to as "pattern"). In this embodiment, out of the sensors 21R, 22R, 23R, 21L, 22L, 23L, and 24, a combination of the sensors that have detected the hand of the user and the sensors that have not detected the hand of the user is employed as the detection state of the sensor unit 112. That is, when the sensor unit 112 performs output based on the pattern of such a combination, the control unit 120 of the HMD 100 is configured to determine, in response to the output of the sensor unit 112, the image display mode through the display unit 111.

Figure 11:
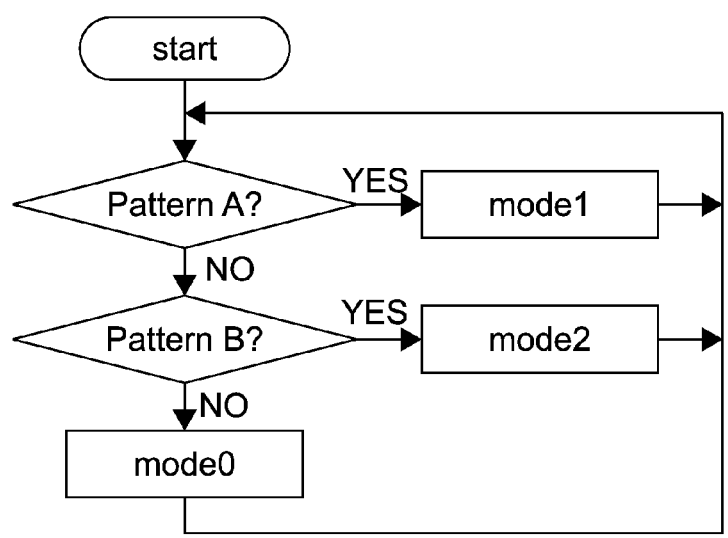
FIG. 11 A flowchart showing functions of the control unit shown in FIG. 2.

FIG. 11 is a flowchart showing an example of a change operation of the image display mode in the control unit 120 of the HMD 100. In FIG. 11, the HMD 100 has three image display modes of "mode 0," "mode 1," and "mode 2." The pattern A of the sensor unit 112 is associated with the "mode 1" and the pattern B of the sensor unit 112 is associated with the "mode 2."

As shown in FIG. 11, the control unit 120 first determines whether or not the pattern of the sensor unit 112 is the pattern A. The control unit 120 sets the image display mode to the mode 1 if the pattern of the sensor unit 112 is the pattern A. If the pattern of the sensor unit 112 is not the pattern A, the control unit 120 further determines whether or not the pattern of the sensor unit 112 is the pattern B. The control unit 120 sets the image display mode to the mode 2 if the pattern of the sensor unit 112 is the pattern B, and sets the image display mode to the mode 0 if the pattern of the sensor unit 112 is not the pattern B.

Applying FIG. 11 to the above-mentioned example for explanation, the "mode 0" corresponds to the "reference mode," the "mode 1" corresponds to the "emphasis mode," and the "mode 2" corresponds to the "specific mode." Then, the pattern A of the sensor unit 112 is, for example, a pattern in which the sensors that detect the hand of the user are the sensors 21R, 22R, and 23R and the sensors that do not detect the hand of the user are the sensors 21L, 22L, and 23L. The pattern B of the sensor unit 112 is, for example, a pattern in which the sensor 21R, 22R, 23R, 21L, 22L, and 23L detect the hand of the user.

Figure 12:
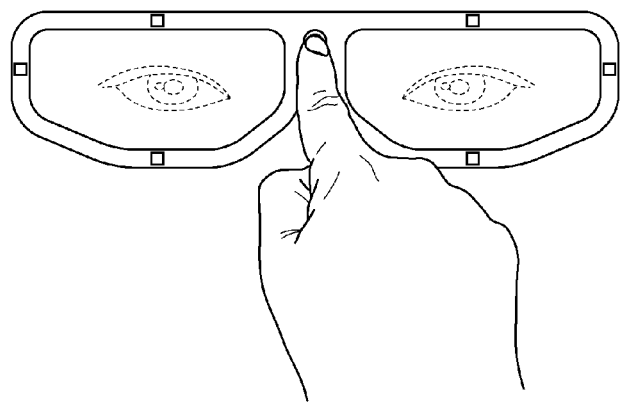
FIG. 12 A front view showing an example of the operation of the user in the first embodiment.

FIG. 12 is a view illustrating an operation of the HMD 100, which is performed by the user's hand. FIG. 12 shows a state in which the user is performing an action of touching the temple 11C of the mounting unit 110 with the finger. The operation performed by the user in FIG. 12 is a natural action intuitively performed when correcting the tilt of the eyeglasses and checking the field of view again. At this time, the finger of the user is held in contact with the sensor 24.

The sensor 24 of the HMD 100 is configured as a touch-type toggle sensor. The user can change the display state of the image every time the user touches the toggle sensor 24 between the image display modes defined in advance. For example, in the case where the image display mode is the "reference mode," the control unit 120 changes the image display mode to the "emphasis mode" when the user touches the toggle sensor 24 once, and changes the image display mode to the "specific mode" when the user touches the toggle sensor 24 twice.

Figure 13:
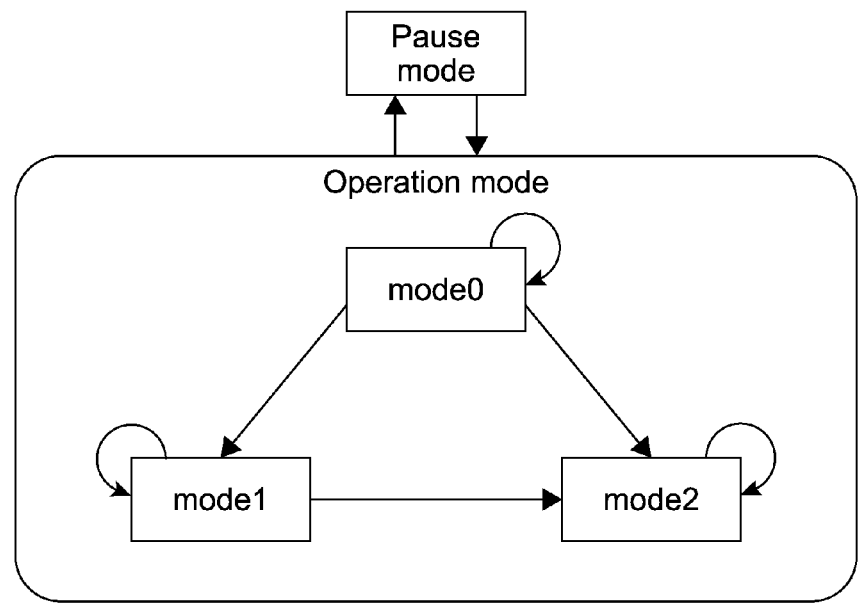
FIG. 13 A front view showing an example of the operation of the user in the first embodiment.

FIG. 13 is a view schematically showing an operation of the control unit 120 in the case of receiving an operation performed through the toggle sensor 24. The "pause mode" in FIG. 13 shows a state in which the operation performed by the user through the toggle sensor 24 is invalidated. The "operation mode" shows a state in which the operation performed by the user through the toggle sensor 24 is validated.

For example, if the user touches the toggle sensor 24 for three seconds, the "pause mode" is changed to the "operation mode" in the HMD 100. Then, if the user touches the toggle sensor 24 for three seconds again, the "operation mode" is changed to the "pause mode." The change method between the "pause mode" and the "operation mode" in the HMD 100 is not limited thereto.

When the HMD 100 is transitioned to the "operation mode," the image display mode first becomes the "mode 0." Then, on the "operation mode," every time the user touches the toggle sensor 24, the image display mode is changed in the order of the "mode 0," the "mode 1," the "mode 2," the "mode 0," and so on. Thus, the user can freely select the image display mode by operating the toggle sensor 24.

As described above, in the HMD 100, using the toggle sensor 24, the user can change the image display mode by a natural action intuitively performed when the user wishes to check the field of view again. Thus, with the HMD 100, the user can select the image display mode by an intuitive action.

As described above, in the HMD 100 according to this embodiment, without using a complicated configuration, for example, a camera that detects an action of the user, an operation using an intuitive action of the user can be performed with a simple configuration. Thus, with the HMD 100, a reduction in weight is achieved and a reduction in cost is achieved.

Second Embodiment

A difference of a head-mounted display system according to a second embodiment of the present technology from the head-mounted display system according to the first embodiment is only a display mode of an image. Thus, hereinafter, components of the head-mounted display system according to the first embodiment will be assumed and the reference symbols of the components will be the same as those in the first embodiment.

Figure 14A:
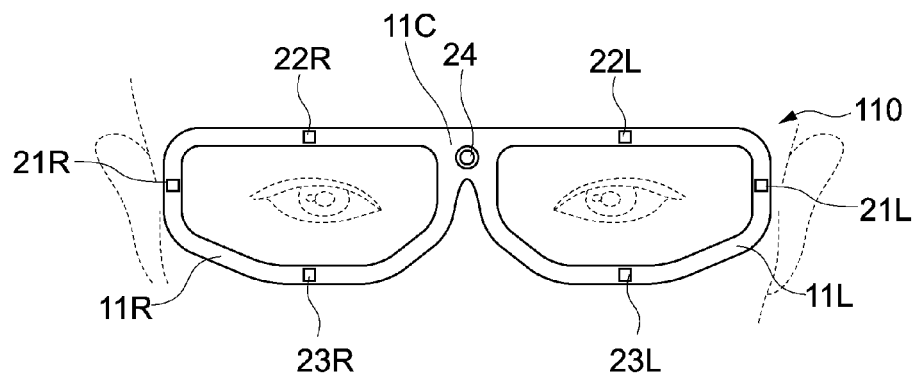
FIG. 14A A front view showing a state in which a mounting unit of a head-mounted display according to a second embodiment of the present technology is worn by the user.

FIG. 14A is a front view showing a state in which the mounting unit 110 of the HMD according to this embodiment is worn by the user. In the state shown in FIG. 14A, the hand of the user to be a detection target is not close to the sensors 21R, 22R, 23R, 21L, 22L, 23L, and 24. Thus, any of the sensors do not detect the hand of the user. In this case, the image display mode in the HMD is transitioned to the reference mode as in the state shown in FIG. 5A according to the first embodiment.

Figure 14B:
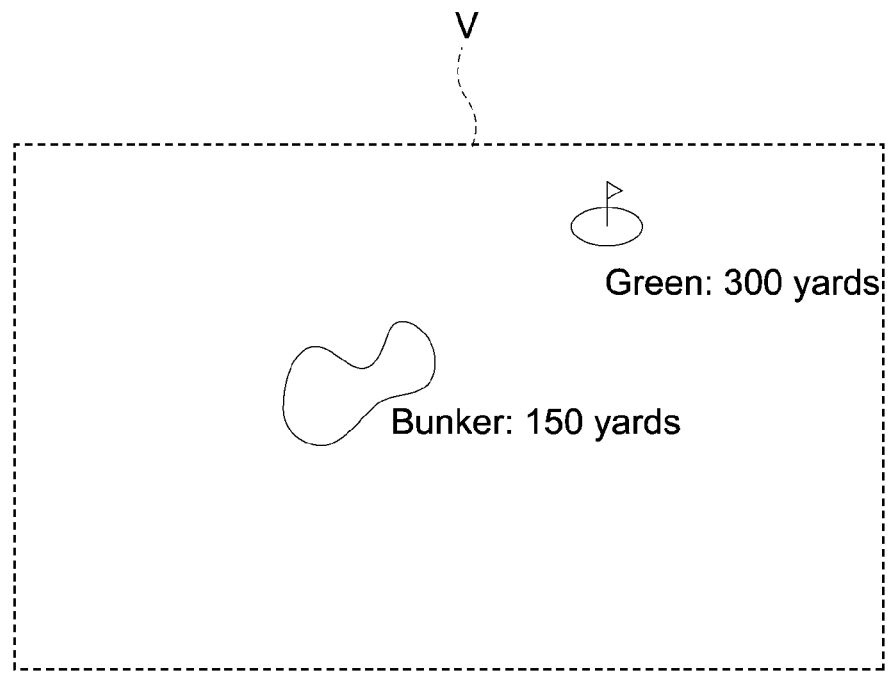
FIG. 14B A view illustrating a field of view of the user in the state shown in FIG. 13A.

FIG. 14B is a view illustrating the field of view V of the user on the reference mode. For the sake of description, FIG. 14B shows only a portion surrounded by a broken line as the field of view V of the user. FIG. 14B shows a state in which the user is playing golf. Thus, a landscape seen through the display unit 111 is a golf course. The user can recognize, in the field of view V, a landscape including a green and a bunker.

In this embodiment, the HMD acquires information of the golf course via the information processing apparatus 200. In FIG. 14B, a character image indicating a distance up to the green is displayed at a position adjacent to the green in the field of view V of the user and the character image indicating a distance up to the bunker is displayed at a position adjacent to the bunker in the field of view V of the user. In addition, the character image based on information on a hole number, a reference shot number (par) of the hole, and the like may be displayed in the field of view V of the user.

In this manner, in the case where a plurality of images are shown in the field of view V of the user, each image is provided with a priority in the HMD according to this embodiment. The priority of each image may be provided by the control unit 120 of the HMD or may be provided by the information processing terminal 200 in advance.

Figure 15A:
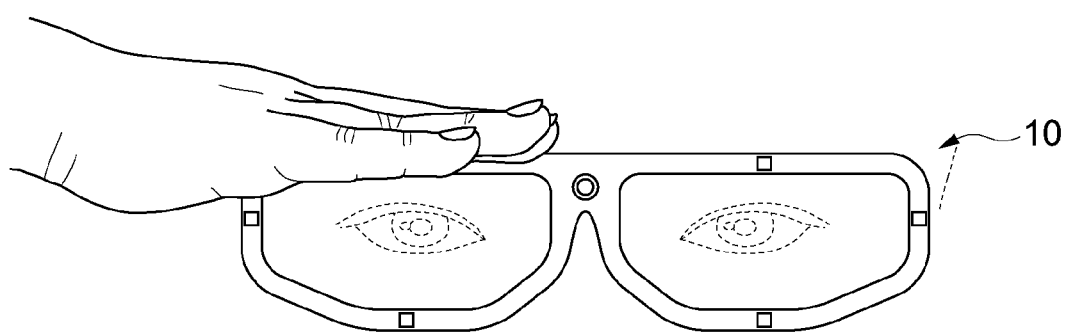
FIG. 15A A front view showing an example of an operation of the user in the second embodiment.

FIG. 15A is a view illustrating an operation of the HMD according to this embodiment, which is performed by the user's hand. FIG. 15A shows a state in which the user is performing an action of putting the palm to the forehead for looking into the distance. The action of the user in FIG. 15A is a natural action intuitively performed by the user when considering in which direction the user has to hit a ball in the next shot.

In the state shown in FIG. 15A, the sensor 22R detects the hand of the user and the sensors 21R, 23R, 21L, 22L, and 23L do not detect the hand of the user. In this case, the emphasis mode is achieved as in the state shown in FIG. 6B.

Figure 15B:
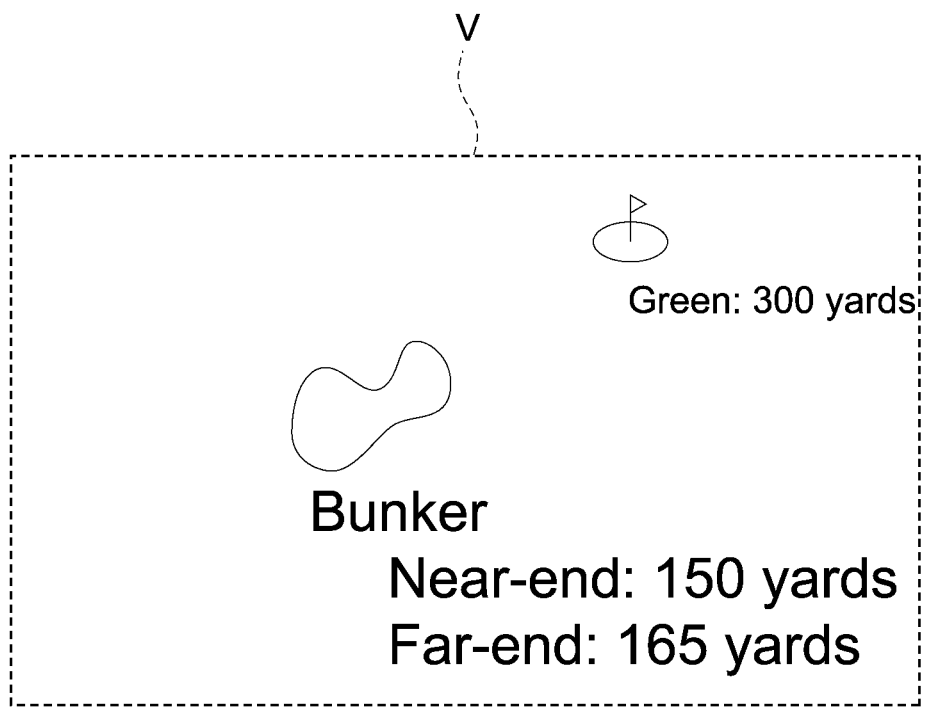
FIG. 15B A view illustrating the field of view of the user in the state shown in FIG. 14A.

FIG. 15B is a view illustrating the field of view V of the user on the emphasis mode. On the emphasis mode, the image having a high priority is emphasized in comparison with the image having a low priority in the field of view V of the user. Specifically, in the state shown in FIG. 15B, the distance up to the green is still far, and hence the user pays attention to the position of the bunker. That is, the priority of the image indicating the "distance up to the green" is higher than the priority of the image indicating the "distance up to the bunker." Thus, in FIG. 15B, the image indicating the "distance up to the bunker" is displayed in an enlarged and emphasized state in comparison with the image indicating the "distance up to the green."

In addition, with the HMD according to this embodiment, the amount of information in an image having a high priority is increased on the emphasis mode. Specifically, FIG. 15B shows character images indicating a distance up to a closest portion of the bunker and a distance up to a furthest position of the bunker. This enables the user to consider, based on such information, whether to hit a ball aiming at the position in front of the bunker or hit a ball aiming at the position beyond the bunker in the next shot.

Although the embodiments of the present invention have been described above, the present invention is not limited only to the above-mentioned embodiments and various modifications can be made without departing from the gist of the present invention, of course.

For example, although the HMD including the display units provided corresponding to the both eyes of the user is described in the above embodiments, the present technology is applicable also to an HMD including a display unit provided corresponding only to one eye of the user. That is, even with the single display unit, by providing the rim portion holding the display unit with sensors, the user can perform an operation of changing the display state of the image by an intuitive action as in the above-mentioned embodiments.

Further, although the see-through-type HMD has been described in the above-mentioned embodiments, the present technology is applicable also to a video-through-type HMD. In this case, although the HMD is provided with a video camera that captures an outside, the HMD can be configured in the same manner as the other see-through-type HMDs.

In addition, although the HMD according to this embodiment has a configuration in which the mounting unit and the control unit are separated from each other, a configuration in which the mounting unit and the control unit are integrated with each other may be employed. In this case, the function of the control unit is added to the mounting unit. This enables the user to perform a hands-free operation on the HMD. Additionally, the head-mounted display system may have a configuration in which the function of the information processing apparatus is added to the mounting unit in addition to the function of the control unit.

Note that the present technology may also take the following configurations.

(1) A head-mounted display, including:
 a mounting unit configured to be mountable on a head of a user;
 a display unit that is provided in the mounting unit and capable of providing the user with a field of view of a real space;
 a sensor unit that is provided in a periphery of the display unit, includes a sensor that is capable of detecting a hand of the user that is brought close to or in contact with the sensor due to an action of the user, and performs output based on a detection result of the sensor; and
 a control unit that displays an image in the field of view and changes, based on a change in output of the sensor unit, a display state of the image.
(2) The head-mounted display according to (1), in which
 the control unit emphasizes the image based on the detection result of the sensor unit.
(3) The head-mounted display according to (2), in which
 the control unit enlarges the image based on the detection result of the sensor unit.
(4) The head-mounted display according to (2) or (3), in which
 the control unit increases a contrast of the image in the field of view based on the detection result of the sensor unit.
(5) The head-mounted display according to (4), in which
 the control unit increases the contrast of the image in the field of view by changing the color of the image.
(6) The head-mounted display according to any one of (2) to (5), in which
 the control unit is capable of displaying a plurality of images, to which priorities are added, in the field of view, and emphasizes, based on the detection result of the sensor unit, the image having a high priority in comparison with the image having a low priority.
(7) The head-mounted display according to any one of (1) to (6), in which
 the control unit increases, based on the detection result of the sensor unit, an amount of information of an image displayed in the field of view.
(8) The head-mounted display according to (7), in which
 the control unit reduces each image in size and increases an amount of information of an image displayed in the field of view.
(9) The head-mounted display according to any one of (1) to (8), in which
 the display unit includes an optical filter having a variable visible light transmittance, and
 the control unit lowers, based on the detection result of the sensor unit, the visible light transmittance of the optical filter.
(10) The head-mounted display according to (9), in which
 the control unit causes, based on the detection result of the sensor unit, the optical filter to cut off visible light.
(11) The head-mounted display according to any one of (1) to (10), in which
 the sensor unit includes a plurality of sensors and performs output based on a detection state of the hand of the user in the plurality of sensors, and
 the control unit changes the display state of the image on a reference mode on which any of the plurality of sensors does not detect the hand of the user, based on a change in output of the sensor unit from the reference mode.
(12) The head-mounted display according to (11), in which
 the sensor unit emphasizes, on an emphasis mode on which the detection state is in a predetermined pattern, the image in comparison with the reference mode.
(13) The head-mounted display according to (11) or (12), in which
 the plurality of sensors include a pair of sensors provided outside both eyes of the user who wears the mounting unit.
(14) The head-mounted display according to (13), in which
 the control unit makes a degree of emphasis of the image higher in a first state in which both of the pair of sensors do not detect the hand of the user, a second state in which either one of the pair of sensors detects the hand of the user, and a third state in which both of the pair of sensors detect the hand of the user, in the order of the first state, the second state, and the third state.
(15) The head-mounted display according to (11) to (14), in which
 the control unit increases, on a specific mode on which the detection state is in a predetermined pattern, an amount of information of an image displayed in the field of view in comparison with the reference mode.
(16) The head-mounted display according to (1) to (15), in which
 the sensor is configured as a toggle sensor, and
 the control unit changes the display state of the image when the toggle sensor detects the hand of the user.
(17) The head-mounted display according to (16), in which
 the control unit changes, when the toggle sensor detects the hand of the user, the display state among the reference mode, an emphasis mode on which the image is emphasized in comparison with the reference mode, and a specific mode on which an amount of information of an image displayed in the field of view is increased in comparison with the reference mode.
(18) The head-mounted display according to (16) or (17), in which
 the toggle sensor is located at a position between both eyes of the user who wears the mounting unit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

DESCRIPTION OF SYMBOLS 100 head-mounted display (HMD)
110 mounting unit
111 display unit
112 sensor unit
120 control unit
21R, 22R, 23R, 21L, 22L, 23L, 24 sensor

The invention claimed is:

1. A head-mounted display, comprising:
a mounting unit configured to be mountable on a head of a user;
a display unit that is provided in the mounting unit and configured to provide the user with a field of view of a real space;
a sensor unit including at least three sensors configured to detect a hand of the user that is brought close to or in contact with the at least three sensors due to an action of the user, the at least three sensors including a first sensor located at a top edge the display unit, a second sensor located at a side edge of the display unit and a third sensor located at a bottom edge of the display unit, the sensor unit configured to perform output based on a detection result of the sensor unit, the detection result including whether each of the first sensor, second sensor and third sensor is close to or in contact with the hand of the user; and
a control unit configured to display an image in the field of view and change a display state of the image based on the output of the sensor unit indicating a change in a pattern of one or more of the first sensor, the second sensor and the third sensor being close to or in contact with the hand of the user, the control unit changing the display state (i) to a first emphasis mode when the first sensor, but not the second sensor and the third sensor, is close to or in contact with the hand of the user, the first emphasis mode causing one of a change in image color of the display state or a change in image size of the display state, and (ii) to a second emphasis mode when each of the first, second and third sensors are close to or in contact with the hand of the user, the second emphasis mode causing the other of the change in image color of the display state or the change in image size of the display state.

2. The head-mounted display according to claim 1, wherein
the control unit changing the display state to the first emphasis mode or the second emphasis mode includes emphasizing the image when the hand of the user is put in front of the sensor unit in a telescope gesture.

3. The head-mounted display according to claim 1, wherein
the control unit changing the display state to the first emphasis mode or the second emphasis mode includes enlarging the image based on the detection result of the sensor unit.

4. The head-mounted display according to claim 1, wherein
the control unit changing the display state to the first emphasis mode or the second emphasis mode includes increasing a contrast of the image in the field of view based on the detection result of the sensor unit.

5. The head-mounted display according to claim 4, wherein
the control unit changing the display state to the first emphasis mode or the second emphasis mode includes increasing the contrast of the image in the field of view by changing a background color of the image.

6. The head-mounted display according to claim 1, wherein
the control unit changing the display state to the first emphasis mode or the second emphasis mode includes displaying a plurality of images with priorities in the field of view and emphasizing the image having a high priority in comparison with the image having a low priority based on the detection result of the sensor unit.

7. The head-mounted display according to claim 1, wherein
the control unit changing the display state to the first emphasis mode or the second emphasis mode includes increasing an amount of information of the image displayed in the field of view based on the detection result of the sensor unit.

8. The head-mounted display according to claim 1, wherein
the control unit changing the display state to the first emphasis mode or the second emphasis mode includes reducing each image in size and increasing an amount of information of the image displayed in the field of view.

9. The head-mounted display according to claim 1, wherein
the display unit includes an optical filter having a variable visible light transmittance, and
the control unit changing the display state to the first emphasis mode or the second emphasis mode includes lowering the visible light transmittance of the optical filter based on the detection result of the sensor unit.

10. The head-mounted display according to claim 9, wherein
the control unit changing the display state to the first emphasis mode or the second emphasis mode includes causing the optical filter to cut off visible light based on the detection result of the sensor unit.

11. The head-mounted display according to claim 1, wherein
the control unit changes the display state of the image on a reference mode when the at least three sensors detect no hand of the user is in proximity.

12. The head-mounted display according to claim 11, wherein
the control unit changing the display state to the first emphasis mode or the second emphasis mode includes reducing the image in comparison with the reference mode on the first or second emphasis mode.

13. The head-mounted display according to claim 1, wherein
the sensor unit includes at least a pair of sensors provided outside both eyes of the user upon wearing the mounting unit.

14. The head-mounted display according to claim 13, wherein
the control unit is configured to make a degree of emphasis of the image higher in a first state in which both sensors of the pair of sensors do not detect the hand of the user, a second state in which either sensor of the pair of sensors detects the hand of the user, and a third state in which both sensors of the pair of sensors detect the hand of the user, in the order of the first state, the second state, and the third state.

15. The head-mounted display according to claim 11, wherein
the control unit changing the display state to the first emphasis mode or the second emphasis mode includes increasing, on a specific mode on which the detection state is in a predetermined pattern, an amount of information of an image displayed in the field of view in comparison with the reference mode.

16. The head-mounted display according to claim 1, further comprising a touch-type toggle sensor, wherein the touch-type toggle sensor is a resistive film sensor, and
the control unit changes the display state of the image when the toggle sensor detects the hand of the user.

17. The head-mounted display according to claim 16, wherein
the control unit changes, when the touch-type toggle sensor detects the hand of the user, the display state among a reference mode, an emphasis mode, and a specific mode on which an amount of information of an image displayed in the field of view is increased in comparison with the reference mode.

18. The head-mounted display according to claim 16, wherein the touch-type toggle sensor is located at a position between both eyes of the user who wears the mounting unit.

19. The head-mounted display according to claim 1, wherein the display unit includes a left display unit and a right display unit, and wherein the at least three sensors include a first sensor located at a top edge of each of the left display unit and the right display unit, a second sensor located at a side edge of each of the left display unit and the right display unit, and a third sensor located at a bottom edge of each of the left display unit and the right display unit.

20. The head-mounted display according to claim 19, wherein a pattern of the first sensor, the second sensor and the third sensor of the left display unit being close to or in contact with the left hand of the user causes the control unit to change to the same display state as the same pattern of the first sensor, the second sensor and the third sensor of the right display unit being close to or in contact with the right hand of the user.

21. The head-mounted display according to claim 1, wherein the control unit is configured to change the display state when at least one of the first sensor, the second sensor and the third sensor is close to or in contact with the hand of the user, while at least another of the first sensor, the second sensor and the third sensor is not close to or in contact with the hand of the user.

22. The head-mounted display according to claim 1, wherein the control unit is configured to change the display state when at least two of the first sensor, the second sensor and the third sensor are close to or in contact with the hand of the user simultaneously.

23. The head-mounted display according to claim 1, wherein the change in image color comprises at least one of a change in image luminance or a change in image contrast.

24. The head-mounted display according to claim 1, wherein the change in image size comprises a change in information size.

25. The head-mounted display according to claim 1, wherein at least one of the first emphasis mode and the second emphasis mode causes both of the change in image color of the display state and the change in image size of the display state.

* * * * *